(12) United States Patent
Briere

(10) Patent No.: US 8,070,440 B2
(45) Date of Patent: Dec. 6, 2011

(54) COOLING CHANNEL FORMED IN A WALL

(75) Inventor: Eric Bernard Dominique Briere, Houilles (FR)

(73) Assignee: SNECMA, Paris (FR)

(*) Notice: Subject to any disclaimer, the term of this patent is extended or adjusted under 35 U.S.C. 154(b) by 534 days.

(21) Appl. No.: 12/356,856

(22) Filed: Jan. 21, 2009

(65) Prior Publication Data

US 2009/0184203 A1 Jul. 23, 2009

(30) Foreign Application Priority Data

Jan. 23, 2008 (FR) ...................................... 08 50402

(51) Int. Cl.
*F01D 5/18* (2006.01)
(52) U.S. Cl. ........................................ 416/95; 416/97 R
(58) Field of Classification Search .................. None
See application file for complete search history.

(56) References Cited

U.S. PATENT DOCUMENTS

2007/0025852 A1* 2/2007 Camhi et al. ................ 416/97 R

FOREIGN PATENT DOCUMENTS

| EP | 1 228 832 A1 | 8/2002 |
| FR | 2 889 089 | 2/2007 |

* cited by examiner

*Primary Examiner* — Cheung Lee
(74) *Attorney, Agent, or Firm* — Oblon, Spivak, McClelland, Maier & Neustadt, L.L.P.

(57) ABSTRACT

A wall element having at least one cooling channel formed therein, the wall element presenting an inside surface and an outside surface, the channel comprising a hole and a diffusion portion, the hole opening out at one end in the inside surface, and at the other end in a diffusion portion where it forms an orifice, the diffusion portion flaring around said orifice and being defined by a bottom wall and a side margin. Said bottom wall presents a first plane portion into which the hole opens out, and a second plane portion situated in front of the first plane portion, said first and second plane portions being inclined in the thickness of the wall. The oriented angle of inclination of said first plane portion is less than the positive oriented angle of inclination of said second plane portion.

9 Claims, 3 Drawing Sheets

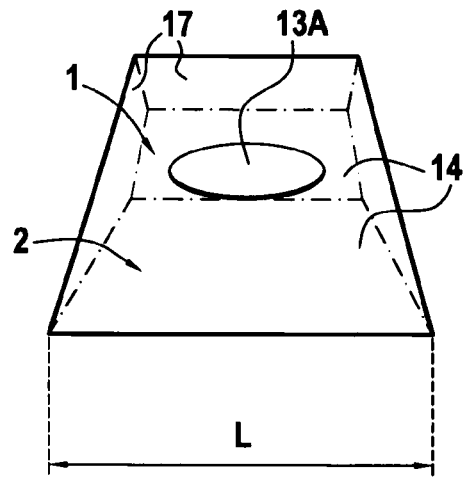
FIG.3
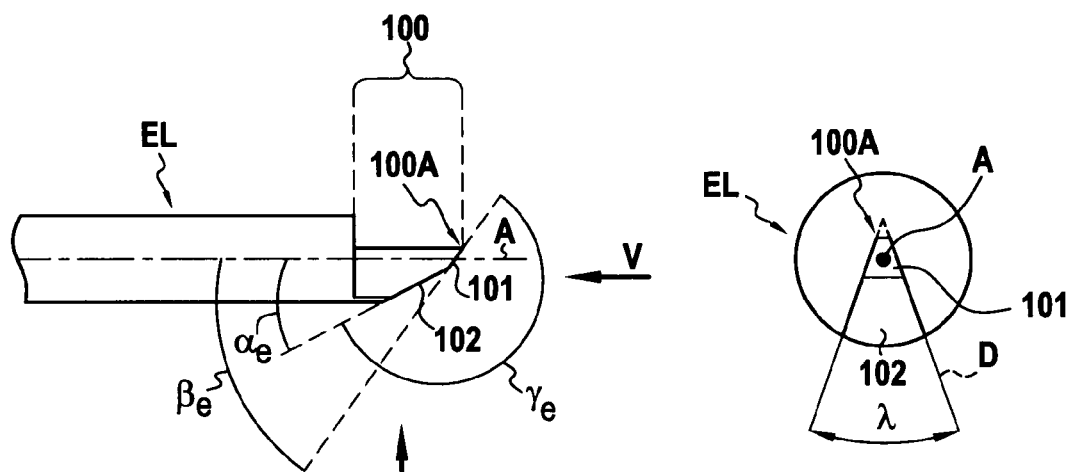
FIG.4
FIG.5
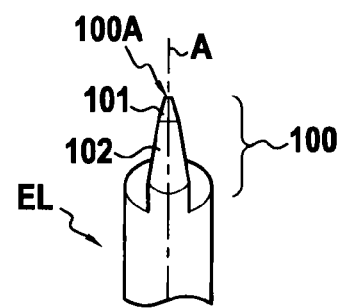
FIG.6

COOLING CHANNEL FORMED IN A WALL

FIELD OF THE INVENTION

The present invention relates to a wall element, to an electrode for forming said wall element, and to an associated method of fabrication. In particular, the wall may be a wall of a hollow blade of a turbomachine turbine.

More precisely, the present invention relates to a wall element having at least one cooling channel formed therein, said wall element presenting an inside surface and an outside surface suitable for being cooled by cool gas flowing in said channel, the channel comprising a hole and a diffusion portion, the hole opening out at one end into the inside surface, and at its other end, into a diffusion portion by forming an orifice, the diffusion portion flaring around said orifice and being defined by a bottom wall and a side margin.

BACKGROUND OF THE INVENTION

Document FR 2 889 089 describes an example of a wall element of the above-specified type forming part of the wall of a hollow blade for an airplane turbojet turbine. FIG. 1 shows another known example, analogous to that of FR 2 889 089. In this example the shape of the diffusion portion 20 is determined by aerodynamic and thermal constraints set by the designer. However, this diffusion portion 20 penetrates very deeply into the wall 22. This has the effect of locally thinning the wall 22 and of weakening it from a mechanical point of view. Under strong and repeated thermal stresses, this thinning encourages the local appearance of cracking, and in the long term of cracks that propagate throughout the part. In particular, is at the hole 23, where the thickness E' of the wall is at its thinnest, that cracks or crack starters are generally seen to appear.

OBJECT AND SUMMARY OF THE INVENTION

An object of the present invention is propose a solution to this problem of mechanical strength while conserving a shape for the diffusion portion that satisfies aerodynamic and thermal constraints.

To achieve this object, the invention provides a wall element of the above-specified type wherein said wall element presents a first plane portion into which the hole opens out, and a second plane portion situated at the front of the first plane portion in the cool gas flow direction, said first and second plane portions being inclined in the thickness of the wall in such a manner that first plane portion is less inclined than the second plane portion. In other words, with reference to the midplane of the diffusion portion containing the axis of the hole, if consideration is given to a first angle measured between the tangent to the outside surface at the point of intersection between the outside surface and the second plane portion, and the first plane portion and to a second angle measured between said tangent and the second plane portion, then, according to the invention, the first oriented angle from said tangent towards said first plane portion is algebraically less than the second angle oriented positive from said tangent towards said second plane portion.

It should be observed that an oriented angle is an angle of value that is relative, i.e. positive or negative. To define the orientation of an angle, it is necessary to determine a reference positive direction of rotation in a frame of reference of the plane in which it is desired to measure the angle. A positive oriented angle is an angle that presents the same direction of rotation as the reference positive direction of rotation. Angles that are oriented in the opposite direction have negative orientation.

Naturally, when measuring an angle defined by two half-lines, it is always the salient (or projecting) angle that is measured and not the reentrant angle. In other words, the angle measured is always less than 180°.

It should be observed that in the invention, although the second angle is strictly positive, the first angle may be strictly positive, strictly negative, or zero.

The wall element of the invention presents the advantage of having a bottom wall of thickness around the hole that is greater than the thickness in known wall elements. Thus, the mechanical strength of said bottom wall against strong and repeated thermal stresses is increased. Furthermore, the overall shape of the diffusion portion conserves good aerodynamic and thermal properties.

In addition, such a shape for the bottom wall serves to attenuate sharp edges between the bottom wall and the side margin. The first plane portion forms an angle with the side margin that is less acute. Sharp edges are a secondary cause of crack formation and crack starter formation. Attenuating sharp edges therefore improves the mechanical behavior of wall elements.

The wall element of the invention also presents the advantage of relative decoupling between the shapes of the two plane portions of the bottom wall. As a result, it is easy to adapt the shape of the second plane portion closely to the aerodynamic and thermal constraints set by the designer. Thus, by means of the invention, it is possible to improve the flow of the cooling stream with broader diffusion over the outside surface of the wall. Improved cooling contributes to avoiding excessive thermal stressing of the wall element, and consequently avoids the risk of forming cracks and crack starters. This advantage also improves the mechanical behavior of wall elements compared with prior art wall elements.

In an embodiment, the first and second plane portions are inclined in the thickness of the wall such that the angle between the first plane portion and the second plane portion, measured in said midplane, has an absolute value lying in the range 130° to 170°.

This range of angle values makes it possible firstly to guarantee that the bottom wall is of sufficient thickness, thereby improving the mechanical strength of the wall around said hole, and secondly to guarantee a shape for the bottom wall that enables the fluid to flow in a manner that satisfies requirements for cooling the outside surface of the wall. Thus, by selecting the angle between the second plane portion and the first plane portion to lie in said range of angle values, the compromise between mechanical strength and flow geometry of the bottom wall is improved.

In an embodiment, the wall element of the invention forms part of the wall of a hollow blade. Under such circumstances, it should be observed that the wall element may belong equally well to a pressure side wall or to a suction side wall, the shape thereof being adapted to both circumstances. This makes it possible to optimize machining operations by using the same tool for making the wall element in the pressure side face and in the suction side face of the blade.

The invention also provides an electrode for forming an indentation in a wall by electro-erosion, the electrode presenting a main axis and a tapered free end portion, wherein said free end portion presents first and second flats in succession along the main axis, the first flat being closer to the free end of the electrode, the angle of inclination of the first flat relative to the main axis being greater than the angle of inclination of the second flat relative to the main axis.

The respective angles of inclination of the flats of the electrode are measured in a plane containing the main axis of the electrode and intersecting both flats.

Such an electrode is suitable for forming an indentation by electro-erosion and serves to form the diffusion portion of the wall element of the invention.

The invention also provides a method of providing a cooling channel in a wall element of the invention by using an electrode of the invention.

Finally, the invention also provides a hollow turbomachine blade including a wall element as described above, and a turbomachine including such a blade.

BRIEF DESCRIPTION OF THE DRAWINGS

The invention and its advantages can be better understood on reading the following detailed description of an embodiment of the invention given by way of non-limiting examples. The description makes reference to the accompanying figures, in which:

FIG. 3 is a plan view in perspective of the FIG. 2 wall element;

FIG. 4 is a side view of an embodiment of an electro-erosion electrode of the invention;

FIG. 5 is a view of FIG. 4 seen looking along arrow V; and

FIG. 6 is a view of FIG. 4 seen looking along arrow VI.

MORE DETAILED DESCRIPTION

Figure 1:
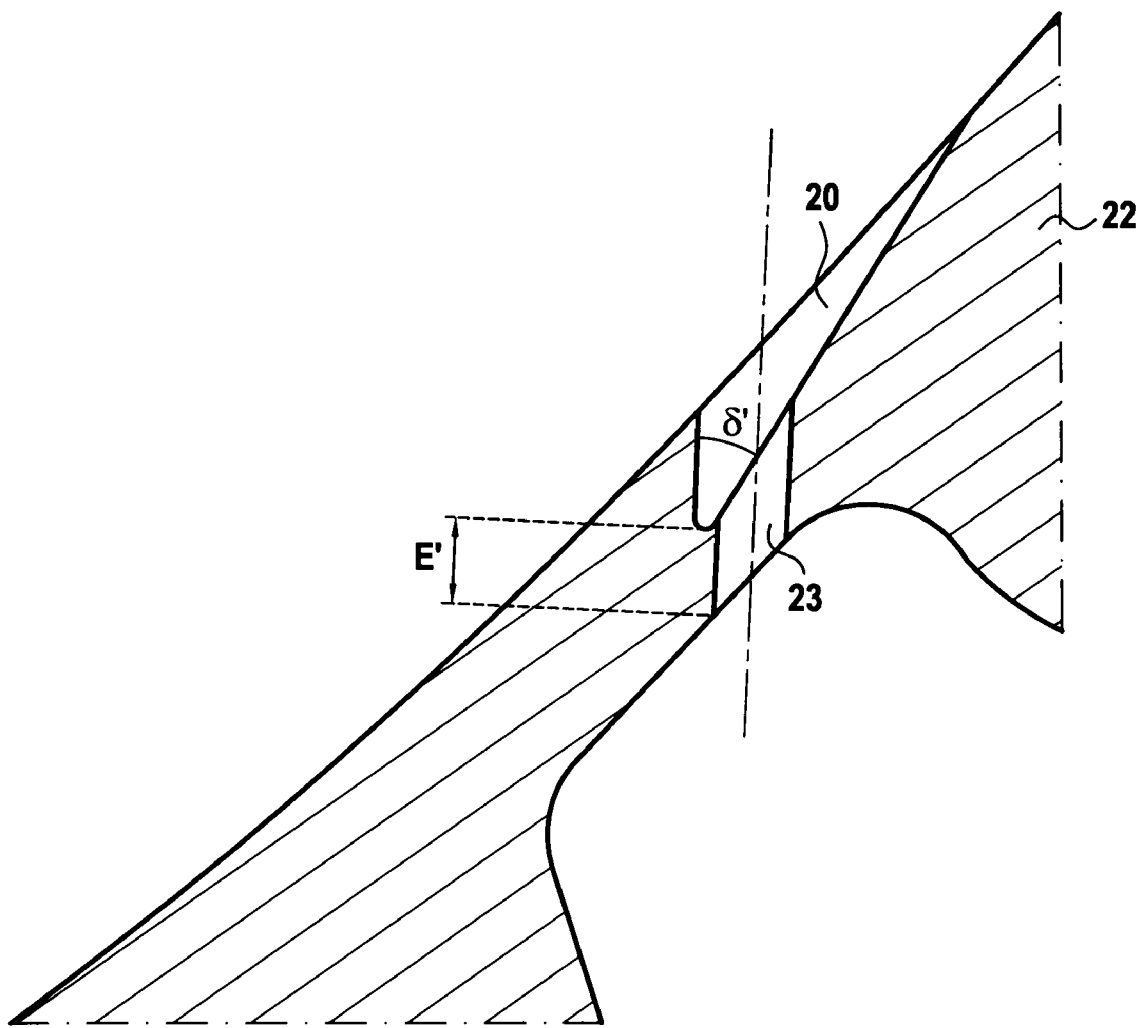
FIG. 1 is a longitudinal section view of a wall element of a prior art hollow blade for a turbomachine.

An embodiment of the wall element is described with reference to FIG. 2. In this example, a wall element 12 having at least one cooling channel formed therein presents an inside surface 16 and an outside surface 15 suitable for being cooled by cool gas flowing in said channel. The channel comprises a hole 13 and a diffusion portion 10. The hole 13 opens out at one end into the inside surface 16, and its other end into the diffusion portion 10, where it forms an orifice 13A. The diffusion portion 10 flares around the orifice 13A and it is defined by a bottom wall 14 and a side margin 17. Said bottom wall 14 presents a first plane portion 1 into which the hole 13 opens out, and a second plane portion 2 situated at the front of the first plane portion 1 in the cool gas flow direction. Said first and second plane portions 1 and 2 are inclined in the thickness of the wall 12. Thus, in the midplane M of the diffusion portion 10 containing the axis AP of the hole, a first angle $\beta$ measured between the first plane portion 1 and the tangent T to the outside surface 15 at the point of intersection of between the outside surface 15 and the second plane portion 2, and a second angle $\alpha$ measured between the second plane portion 2 and said angle T, are such that the first angle $\beta$ oriented from said tangent T towards said first plane portion 1 is algebraically less than the positive second angle $\alpha$ oriented from said tangent T towards said second plane portion 2.

The second angle $\alpha$ lies in the range +10° to +400. The angle $\gamma$ between the second plane portion 2 and the first plane portion 1, measured in said midplane M has an absolute value lying in the range 1300 and 1700.

In the embodiment shown, said first angle $\beta$ is strictly negative.

In such a wall element, the local frame of reference and the orientations of the angles in the midplane M of the diffusion portion 10 are defined as follows. A first axis Y of the local frame of reference is selected parallel to the axis AP of the hole 13 and extends from the inside surface 16 towards the outside surface 15. A second axis X of the local frame of reference is selected to be perpendicular to the axis Y oriented in the flow direction of the cooling gas. In this frame of reference (X; Y), positive angles go from the axis X towards the axis Y. Conversely, negative angles go from the axis Y towards the axis X.

The values of the angles $\alpha$ and $\gamma$ as defined above present several advantages. By selecting the second oriented angle $\alpha$ in the range of positive angles [+10°, +40°] it is ensured that the cooling stream is diffused optimally. In addition, by selecting the angle $\gamma$ to have an absolute value lying in the range of angles [130°, 170°] ensures an optimum thickness of material for the bottom wall 14 over the entire plane portion 1.

Figure 2:
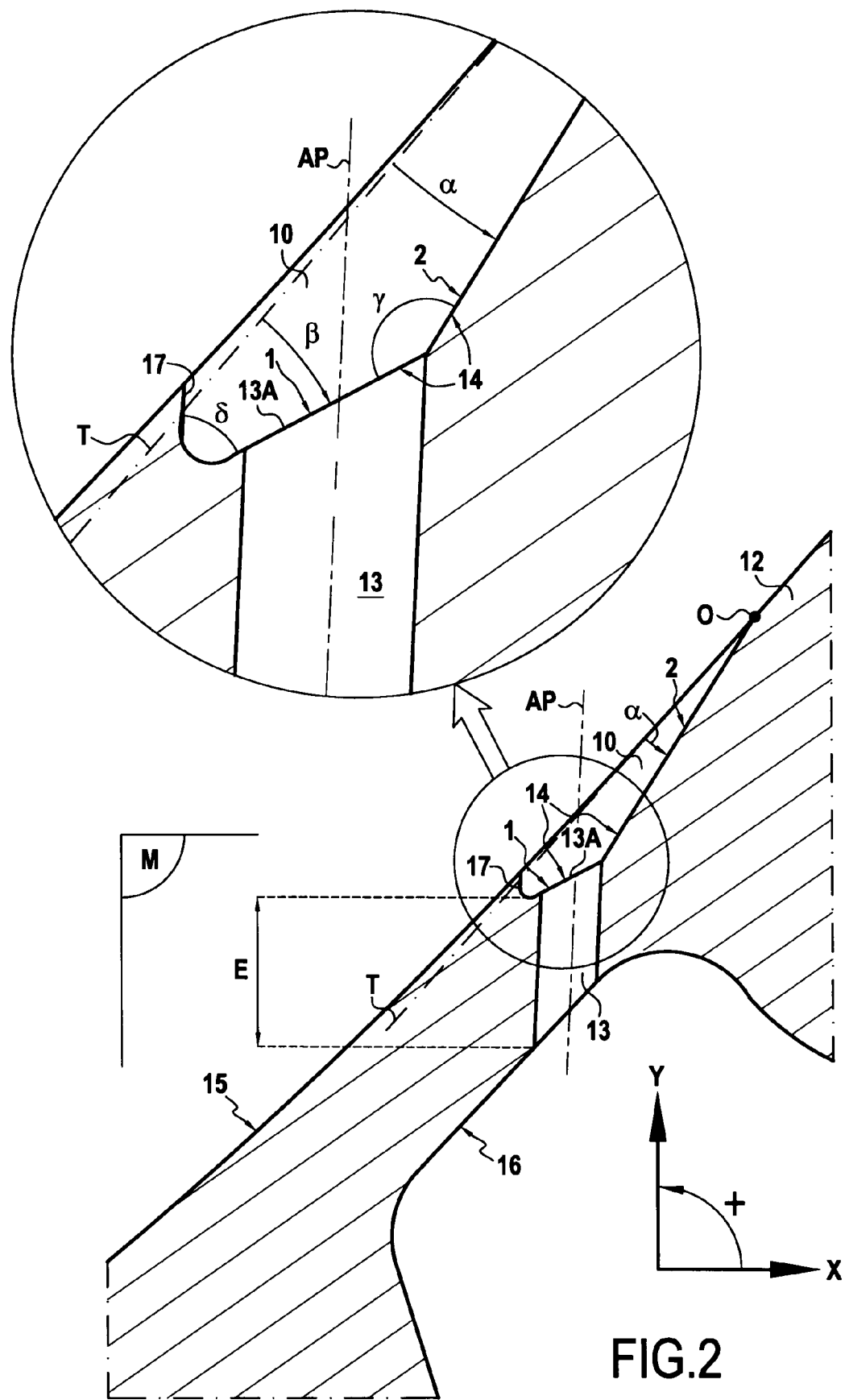
FIG. 2 is a longitudinal section view of a wall element in an embodiment of the present invention.

By comparing FIGS. 1 and 2, it can clearly be seen that the minimum thickness E of the bottom wall 14 in the vicinity of the hole 13 is greater than the minimum thickness E' of the bottom wall in prior art wall elements.

Still in comparison between FIGS. 1 and 2, the angle $\delta$ between the rear side margin 17 and the plane portion 1 is considerably greater than the corresponding angle $\delta'$ in the prior art (i.e. the angle $\delta$ between the plane portion 1 and the rear side margin 17 is not as sharp as the angle $\delta'$).

These last two characteristics provide better mechanical resistance to thermal stresses.

A plan view in perspective of the FIG. 2 embodiment can be seen in FIG. 3. In this view, the open width L of the second plane portion 2 of the bottom wall 14 is wider than in the prior art for given minimum thickness of the bottom wall 14. This results in a significant improvement in the flow of the cooling stream with wider diffusion.

An embodiment of an electro-erosion electrode of the invention is described with reference to FIGS. 4, 5, and 6. In this example, the electrode EL for forming an indentation in a wall by electro-erosion presents a main axis A and a tapered free end portion 100. Said free end portion 100 presents first and second flats 101 and 102 in succession along the direction of the main axis A. The first flat 101 is closer to the free end 100A of the electrode EL. The angle of inclination $\beta_e$ of the first flat 101 relative to the main axis A is greater than the angle of inclination $\alpha_e$ of the second flat 102 relative to the main axis A.

The free end portion 100 is inscribed within a dihedron D oriented along the main axis A of the electrode EL, said dihedron D is made up of two half-planes that meet on a common straight line.

A dihedron is made up of two half-planes that meet on a common straight line. When a dihedron is said to be oriented along the main axis A of the electrode EL, that means that the straight line where said half-planes meet is parallel to the main axis A of the electrode EL.

The angle $\gamma_e$ is the angle measured between the first flat 101 and the second flat 102 in the plane of FIG. 4 (the plane containing the main axis A and intersecting the flats 101 and 102 so as to contain their middle axes). Unlike the above remark that it is always the salient side of an angle that is measured, the angle $\gamma_e$ is an exception and it measures more than 180°. The angle $\alpha_e$ is the angle measured between the second flat 102 and the main axis A of the electrode EL. The angle $\beta_e$ is the angle measured between the first flat 101 and the main axis A of the electrode EL. The angle $\gamma_e$ of the electrode EL corresponds to the angle $\gamma$ of the wall element 12 in FIG. 2. The angles $\alpha_e$ and $\beta_e$ of the electrode EL correspond to the angles $\alpha$ and $\beta$ of the wall element 12 of FIG. 2, making allowance for the axis on which the electrode is applied against the outside surface 15 of the wall 12.

Advantageously, the angle $\alpha_e$ lies in the range 10° to 50°. Similarly, the angle $\gamma_e$ lies in the range 190° to 230°. Furthermore, the angle $\lambda$ of the dihedron D (see FIG. 5) advantageously lies in the range 20° to 80°.

This embodiment of the electrode is particularly reliable. Such an electrode makes it possible to make a large number of indentations in succession without being spoilt significantly. It is also easy to re-sharpen. I.e. after it has been used intensively and possibly suffered wear, the endpiece of the electrode as described by the present invention can be machined so as to be suitable for use again. Furthermore, this example electrode is particularly adapted to making indentations both in the pressure side wall and in the suction side wall of a blade. Thus, all of the indentations in a given blade can be machined using this electrode.

Advantageously, said indentation is formed by orienting the main axis of said electrode parallel to the axis of said hole. This makes it easier to adjust the machinery while fabricating the blade.

What is claimed is:

1. A wall element having at least one cooling channel formed therein, said wall element presenting an inside surface and an outside surface suitable for being cooled by cool gas flowing in said channel, the channel comprising a hole and a diffusion portion, the hole opening out at one end into the inside surface, and at its other end, into a diffusion portion by forming an orifice, the diffusion portion flaring around said orifice and being defined by a bottom wall and a side margin, wherein said bottom wall presents a first plane portion into which the hole opens out, and a second plane portion situated at the front of the first plane portion in the flow direction of the cool gas, said first and second plane portions being inclined in the thickness of the wall in such a manner that, in the midplane of the diffusion portion containing the axis of the hole, a first angle measured between the tangent to the outside surface at the point of intersection between the outside surface and the second plane portion and the first plane portion, and a second angle measured between said tangent and the second plane portion are such that the first angle oriented from said tangent towards said first plane portion is algebraically less than the second angle oriented positive from said tangent towards said second plane portion, in such a manner that the angle between the second plane portion and the first plane portion as measured in said midplane lies, in absolute value, in the range 130° to 170°.

2. A wall element according to claim 1, wherein said second angle lies in the range +10° to +40°.

3. A wall element according to claim 1, wherein said first angle is strictly negative or zero.

4. A hollow turbomachine blade including a wall element according to claim 1.

5. A turbomachine including a blade according to claim 4.

6. An electrode for forming an indentation in a wall by electro-erosion, the electrode presenting a main axis and a tapered free end portion, wherein said free end portion presents first and second flats in succession along the direction of the main axis, the first flat being closer to the free end of the electrode, the angle of inclination of the first flat relative to the main axis being greater than the angle of inclination of the second flat relative to the main axis, and the angle measured between the first flat and the second flat, in the plane containing the main axis and intersecting the flats via their middle axes, lies in the range 190° to 230°.

7. An electrode according to claim 6, wherein said free end portion is inscribed in a dihedron oriented along the main axis of the electrode, said dihedron intersecting the two planes defined by the flats.

8. A method of providing a cooling channel in a wall presenting an inside surface and an outside surface suitable for being cooled by cool gas flowing in said channel, the channel comprising a hole and a diffusion portion, the hole opening out at one end in the inside surface and at the other end in the diffusion portion where it forms an orifice, the diffusion portion flaring around said orifice and being defined by a bottom wall and a side margin, wherein, in two distinct steps, the wall is pierced to make said hole, and an indentation is formed in the wall to make said diffusion portion, and wherein said indentation is formed by using an electro-erosion electrode according to claim 6.

9. A method according to claim 8, wherein said indentation is formed by orienting the main axis of said electrode parallel to the axis of said hole.

* * * * *